(12) United States Patent
Haag et al.

(10) Patent No.: US 11,933,998 B2
(45) Date of Patent: Mar. 19, 2024

(54) FILM STACKS FOR THIN CIRCULAR POLARIZERS

(71) Applicant: 3M INNOVATIVE PROPERTIES COMPANY, St. Paul, MN (US)

(72) Inventors: Adam D. Haag, Woodbury, MN (US); Michael A. Johnson, Stillwater, MN (US); Michelle L. Toy, North St. Paul, MN (US); Brianna N. Wheeler, Bloomington, MN (US); David T. Yust, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 18 days.

(21) Appl. No.: 17/757,337

(22) PCT Filed: Dec. 22, 2020

(86) PCT No.: PCT/IB2020/062338
§ 371 (c)(1),
(2) Date: Jun. 14, 2022

(87) PCT Pub. No.: WO2021/130673
PCT Pub. Date: Jul. 1, 2021

(65) Prior Publication Data
US 2023/0025509 A1     Jan. 26, 2023

Related U.S. Application Data

(60) Provisional application No. 62/953,634, filed on Dec. 26, 2019.

(51) Int. Cl.
*G02B 5/30*     (2006.01)
*B32B 7/023*    (2019.01)
(Continued)

(52) U.S. Cl.
CPC .......... *G02B 5/3041* (2013.01); *B32B 7/023* (2019.01); *B32B 7/03* (2019.01); *B32B 7/06* (2013.01);
(Continued)

(58) Field of Classification Search
CPC ........ G02B 5/3041; B32B 7/023; B32B 7/03; B32B 7/06; B32B 27/08; B32B 27/306;
(Continued)

(56) References Cited

U.S. PATENT DOCUMENTS 6,096,375 A   8/2000   Ouderkirk et al.
6,111,697 A   8/2000   Merrill et al.
(Continued)

FOREIGN PATENT DOCUMENTS

WO   2016035636 A1   3/2016
WO   2016158300 A1   10/2016
(Continued)

OTHER PUBLICATIONS

International Search Report for PCT International Application No. PCT/IB2020/062338, dated May 13, 2021, 3 pages.
(Continued)

*Primary Examiner* — Joseph L Williams
(74) *Attorney, Agent, or Firm* — Lisa P. Fulton; Robert S. Moshrefzadeh; Clifton F. Richardson

(57) ABSTRACT

A film stack includes an oriented first layer including polyvinyl alcohol disposed on an oriented second layer including naphthalene dicarboxylate containing copolyester resin. The oriented second layer has in-plane birefringence $\Delta n_{xy} < 0.02$.

20 Claims, 6 Drawing Sheets

(51) Int. Cl.
  *B32B 7/03* (2019.01)
  *B32B 7/06* (2019.01)
  *B32B 27/08* (2006.01)
  *B32B 27/30* (2006.01)
  *B32B 27/36* (2006.01)
  *B32B 38/10* (2006.01)
  *B32B 38/14* (2006.01)

(52) U.S. Cl.
  CPC ............ *B32B 27/08* (2013.01); *B32B 27/306* (2013.01); *B32B 27/36* (2013.01); *B32B 38/10* (2013.01); *B32B 38/14* (2013.01); *G02B 5/3016* (2013.01); *B32B 2250/02* (2013.01); *B32B 2250/24* (2013.01); *B32B 2255/10* (2013.01); *B32B 2307/4026* (2013.01); *B32B 2307/42* (2013.01); *B32B 2307/422* (2013.01); *B32B 2329/04* (2013.01); *B32B 2367/00* (2013.01); *B32B 2551/00* (2013.01)

(58) Field of Classification Search
  CPC .. B32B 27/36; B32B 2250/02; B32B 2307/42
  See application file for complete search history.

(56) References Cited

U.S. PATENT DOCUMENTS

| | | |
|---|---|---|
| 6,307,676 B1 | 10/2001 | Merrill et al. |
| 9,618,668 B2 | 4/2017 | Kitagawa |
| 2002/0110685 A1 | 8/2002 | Ebihara et al. |
| 2002/0180916 A1 | 12/2002 | Schadt et al. |
| 2003/0028048 A1 | 2/2003 | Cherkaoui et al. |
| 2005/0072959 A1 | 4/2005 | Moia et al. |
| 2009/0218707 A1 | 9/2009 | Stover et al. |
| 2015/0285956 A1 | 10/2015 | Schmidt et al. |
| 2018/0172888 A1 | 6/2018 | Johnson et al. |

FOREIGN PATENT DOCUMENTS

| | | |
|---|---|---|
| WO | 2019003107 A1 | 1/2019 |
| WO | 2019032635 A1 | 2/2019 |
| WO | 2019092571 A1 | 5/2019 |

OTHER PUBLICATIONS

Pongratz, "Vader Cross Hatch Adhesion Test Method", 2017, Version 1, pp. 1-27.

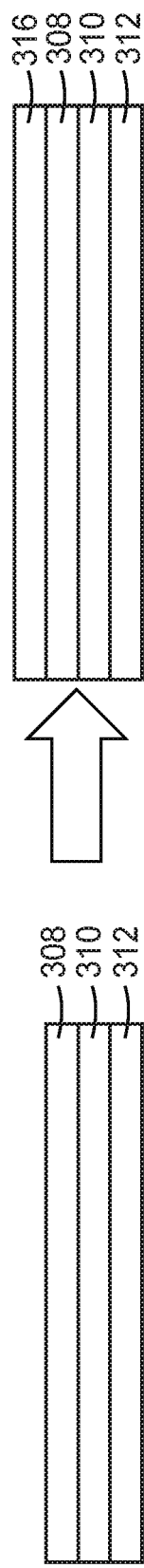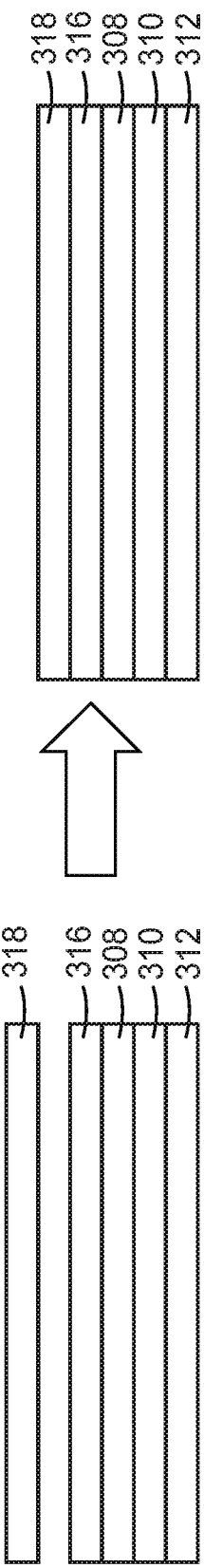

FILM STACKS FOR THIN CIRCULAR POLARIZERS

CROSS REFERENCE TO RELATED APPLICATIONS

This application is a national stage filing under 35 U.S.C. 371 of PCT/IB2020/062338, filed Dec. 22, 2020, which claims the benefit of U.S. Provisional Patent Application No. 62/953,634, filed Dec. 26, 2019, the disclosure of which is incorporated by reference in its/their entirety herein.

FIELD

This invention relates to film stacks useful for circular polarizers and to methods of making the film stacks.

BACKGROUND

Emissive displays such as organic light emitting diode (OLED) displays often utilize circular polarizers as antireflection films. Typically, circular polarizers comprise film components laminated together and are relatively thick. With the development of new form factors such as bendable and rollable emissive displays, there is a need for thinner display components. The traditional thick film stack circular polarizers cannot survive the tight bend radii needed for bendable and rollable displays. Past attempts to make thin (e.g., less than 50 µm thick) circular polarizers has resulted in films that have problems with mechanical integrity and that crack or break during bending and folding.

SUMMARY

In view of the foregoing, we recognize that there is a need for thin yet mechanically robust circular polarizers.

In one aspect, the present invention provides a film stack comprising an oriented first layer comprising polyvinyl alcohol disposed on an oriented second layer comprising naphthalene dicarboxylate containing copolyester resin. The oriented second layer has in-plane birefringence $\Delta nxy<0.02$.

In another aspect, the present invention provides a film stack comprising (a) a carrier film comprising a strippable layer disposed between an oriented second layer comprising naphthalene dicarboxylate containing copolyester resin with in-plane birefringence $\Delta nxy<0.02$ and a layer of strain hardening polyester having a glass transition temperature at least 5° C. greater than the glass transition temperature of the naphthalene dicarboxylate containing polyester resin of the oriented second layer, and (b) an oriented first layer comprising polyvinyl alcohol disposed on the oriented second layer opposite the strippable layer.

The film stacks of the invention enable circular polarizers having a total thickness less than 35 µm, 25 µm, 20 µm, 15 µm, 10 µm, 5 µm or 3 µm that are mechanically robust and thus useful for highly curved, foldable or rollable displays.

In still another aspect, the present invention provides a method of making a film stack comprising (a) providing a carrier film comprising a strippable layer disposed between a second layer comprising naphthalene dicarboxylate containing copolyester resin with in-plane birefringence $\Delta nxy<0.02$ and a layer of strain hardening polyester having a glass transition temperature at least 5° C. greater than the glass transition temperature of the naphthalene dicarboxylate containing polyester resin of the oriented second layer, (b) coating a first layer comprising polyvinyl alcohol on the strain hardening polyester, and (c) orienting the resulting coated carrier film in a second direction.

BRIEF DESCRIPTION OF THE DRAWINGS

FIGS. 3A-3F are cross-sectional views of a film stack being made according to a process.

DETAILED DESCRIPTION

Figure 1:
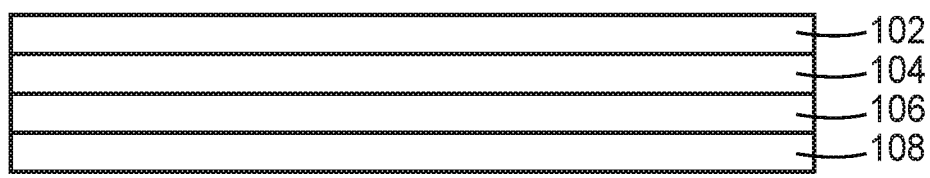
FIG. 1 is a cross-sectional view of a film stack.

The present invention enables a very thin circular polarizer comprising a stained polyvinyl alcohol (PVOH) layer, a substrate and a quarter-wave retarder. In some embodiments, the PVOH layer is less than 10 µm thick, substrate is less than 20 µm thick, the quarter-wave retarder is less than 5 µm and the total thickness of the thin circular polarizer is less than 35 µm, 25 µm, 20 µm, 15 µm, 10 µm, 5 µm or 3 µm.

We recognized that in order to create such a thin circular polarizer from a thin PVOH layer several problems needed to be solved. For example, the quarter wave retarder, which comprises an oriented polymeric material or a coated liquid crystal material, must adhere to the PVOH coating. PVOH is typically processed in water whereas liquid crystals are typically in organic solvents. Also, the resulting film construction must be mechanically robust, but the PVOH is susceptible to cracking and damage due to stress during iodine staining and optional borating. In addition, the optical performance of the circular polarizer must not be distorted by birefringence from other layers or disruption to the polarization efficiency of the stained PVOH.

In order to provide mechanical integrity to the thin PVOH layer the present invention utilizes a coextruded tough film layer to carry the PVOH through the process. This tough film layer has many constraints. For example, it must be able to be coextruded with a carrier layer and have similar rheology. PVOH must adhere to the tough film layer. The tough film layer must stretch at conditions suitable for both a strain hardening layer polyester (e.g., polyethylene terephthalate, polyethylene naphthalate or copolyesters thereof) and PVOH. The tough layer must have little or no birefringence and must resist (i.e., not haze or craze) the liquid crystal solvents. The tough film layer must be dimensionally stable through the PVOH staining process.

It has been discovered that naphthalene dicarboxylate containing copolyester resin with in-plane birefringence $\Delta nxy<0.02$ meets all the necessary constraints of the tough film layer. Birefringence can be calculated from resin layer refractive indices measurement. Refractive indices can be measured using a Metricon Prism coupler (Metricon Corporation, Pennington, N.J.) in the MD, TD, and TM directions, typically using a red laser (i.e., 635 nm). MD and TD are in-plane directions and TM is normal to the film surface. The refractive indices of TD, MD and TM are labeled as: $n_x$, $n_y$, and $n_z$, respectively.

In-Plane Birefringence, $\Delta n_{in}$: In order to measure the birefringent nature of a uniaxially stretched film, in-plane birefringence is used.

In-plane birefringence concerns the difference of the indices ($n_x$ and $n_y$) in the orthogonal in-plane directions.

More specifically for a uniaxially stretched film, in-plane birefringence refers to the difference between the stretching direction and the non-stretching direction. For example, assuming a film is uniaxially stretched in TD direction, the in-plane birefringence is expressed as following:

$$\Delta n_{in} = n_x - n_y = \Delta n_{xy}$$

Where $n_x$ is the refractive index in the stretching direction (in this case, MD), and $n_y$ is the non-stretching direction (in this case, TD).

For a biaxially stretching film, the in-plane birefringence is relatively small and sometimes close to zero if balanced. Instead, out-of-plane birefringence is more indicative of the birefringent nature of the stretched film.

Out-of-Plane Birefringence, $\Delta n_{out}$: In order to measure the birefringent nature of a biaxially oriented film, out-of-plane birefringence is used.

Out-of-plane birefringence concerns the difference between average of in-plane indices (MD and TD) and the index normal to the film (TM). Out-of-plane birefringence can be expressed as following:

$$\Delta n_{out} = \frac{(n_x + n_y)}{2} - n_z$$

where $n_x$ refractive index_in MD and $n_y$ is refractive index in TD and $n_z$ is refractive index in TM.

Out-of-plane birefringence can also be used to measure the birefringent nature of uniaxially stretched films.

Preferably, the naphthalene dicarboxylate containing copolyester resin has an in-plane retardance less than 100 nm when oriented. Retardance may be measured from a polarimeter from Axometric, Inc. Huntsville, AL. Examples of naphthalene dicarboxylate containing copolyesters are mixed diol substituted co-polyethylene naphthalene-2,6-dicarboxylate, polyethylene terephthalate-co-naphthalene-2,6-dicarboxylate, mixed diol substituted polyethylene terephthalate-co-naphthalene-2,6-dicarboxylate, polyethylene naphthalene-2,6-dicarboxylate-co-biphenyl-4,4'-dicarboxylate, mixed diol substituted polyethylene naphthalene-2,6-dicarboxylate-co-biphenyl-4,4'-dicarboxylate, polyethylene terephthalate-co-naphthalene-2,6-dicarboxylate-co-biphenyl-4,4'-dicarboxylate, and mixed diol substituted polyethylene terephthalate-co-naphthalene-2,6-dicarboxylate-co-biphenyl-4,4'-dicarboxylate. Mixed diols can comprise two carbon C2 up to ten carbon C10 linear, branched or cyclic chain lengths. Isophthalates such as dimethyl sulfosodium isophthalate ionomer may also be substituted for terephthalate, 2,6-naphthalene dicarboxylate, and 4,4'-biphenyl dicarboxylates. A copolymer of polyethylene naphthalate (coPEN) known as PENg30 is a coPEN polyester. The manufacturing method and material composition (100% dimethyl-2,6-naphthalene dicarboxylate (NDC) on esters, 70 mol % ethylene glycol and 30 mol % cyclohexanediol (CHDM) on a diols basis) is described, e.g., in WO 2019/032635. PENg40 and PENg50 are also coPEN polyesters with 40 mol % and 50 mol % CHDM on a diols basis and are also described in WO 2019/032635. Preferably, the Tg is greater than the highest temperature of the staining process.

PENg materials are heat set or annealed after stretching to "melt out" any birefringence caused in stretching. PVOH, however, is known to lose optical performance when heat set or annealed. Surprisingly, we have discovered that conditions can be found that to provide low enough birefringence in the PENg while still maintaining good optics in the PVOH layer.

In one embodiment, a coextruded multilayer film as shown in FIG. 1 is useful. Multilayer film 100 comprises an orienting layer 102, optional tie layer 104, peel layer 106 and PENg tough layer 108. Orienting layer 102 provides strain hardening and supports the film during orienting. Tie layer 104 and peel layer 106 are designed to peel away with orienting layer 102 when peeled away from PENg tough layer 108.

Orienting layer 102 is a layer of strain hardening polyester having a glass transition temperature (Tg) at least 5° C. greater than the glass transition temperature of the naphthalene dicarboxylate containing polyester resin of the oriented second layer. The phrase "glass transition temperature" or "Tg" refers herein to the on-set glass transition temperature by DSC and is measured according to ASTM E1256-08 2014.

Preferably orienting layer 102 is PEN or Low Melt PEN or PET. PEN can be described as a 0.48 IV polyethylene 2,6-naphthalate polymer. Low Melt PEN can be described as a 0.48 IV copolyester comprised of 90 mol % naphthalate moieties and 10 mol % terephthalate moieties on an esters basis. Ethylene glycol comprises the diols in this polymer. The orienting layer serves as the carrier vehicle, support substrate, enabling flat film production during both the orientation and annealing process. Post-annealing, the orienting layer serves to provide high modulus and dimensional stability. Preferably, orienting layer 102 has a Tg greater than the staining temperature.

Tie layer 104 is optional. The tie layer material or materials are preferably an elastic olefin or olefin blend exhibiting excellent adhesion (>300 gli) to polyesters. These olefins must be capable of co-extrusion and co-orientation with the other layers. Exemplary elastic olefins include Kraton G1645 and Kraton G1657 available from the Kraton Corporation. These materials can also be blended with low levels of other materials such as SR549M or Pelestat 230 to tailor physical and adhesion properties and/or to enhance electrostatic pinning performance.

Materials for peel layer 106, also referred to as a strippable layer, are preferably a blend of the following materials: a polypropylene or co-polypropylene capable of co-extrusion and co-orientation with the orienting layer, PENg tough layer and tie layer. An example of these materials is Pro-Fax SR549M, a co-polypropylene (7% polyethylene) available from Lyondell-Basell. These polypropylenes comprise 70 or more wt % of the peel layer and are a blend with one or more of the following: an SEBS/SEPS block copolymer capable of co-extrusion and co-orientation with the orienting layer, PENg tough layer and tie layer. Examples of these materials include Kraton G1645 and Kraton G1657 available from the Kraton Corporation. The peel may also contain an olefinic antistatic agent capable of co-extrusion and co-orientation with the orienting layer, PENg tough layer and tie layer, which will enhance electrostatic pinning in the film casting process. An exemplary antistatic resin is Pelestat 230 available from Sanyo Chemical Industries. The peel layer designed to provide approximately 5 to 40 gli of adhesion to the PENg tough layer or the orienting layer.

Figure 2:
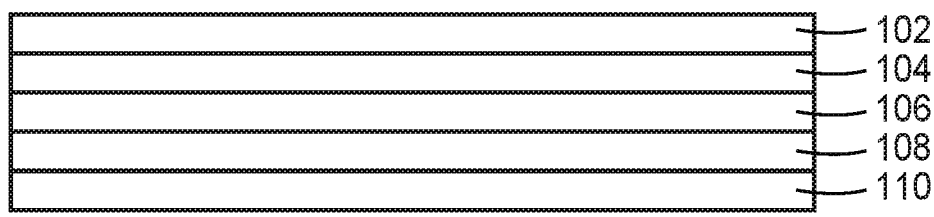
FIG. 2 is a cross-sectional view of a film stack.

As shown in FIG. 2, multilayer film 100 can be coated with polyvinyl alcohol (PVOH) solution, dried and then stretched, e.g., using a standard tenter optionally with heat. Preferably, multilayer film 100 is stretched in the length direction prior to coating with PVOH so that multilayer film 100 is biaxially oriented, while the PVOH is stretched only uniaxially. Biaxially orienting multilayer film 100 provides beneficial mechanical properties so that the film stack is more robust and less likely to tear.

PVOH layer 110 can be any suitable thickness, preferably less than 5 µm thick after orientation. In some embodiments, the PVOH layer may be 0.5 µm, 0.8 µm or 1.2 µm to 1.5 µm, 2 µm or 3 µm thick after orientation. The PVOH layer may be coated or extruded over the multilayer film described above such that the multilayer film and the PVOH layer can be oriented together. The general process for producing PVOH films is described, e.g., in U.S. Pat. No. 6,096,375. The PVOH coating solution typically contains between 2 and 20% polymer in water based on weight, with the preferred concentration typically being between 5 and 15%. In some embodiments, the PVOH coating comprises water, PVOH and surfactant. Kuraray 2899 from Kuraray America (Houston, TX) is an example of a suitable PVOH. The PVOH should have a degree of hydrolysis of between 95 and 100%, preferably between 97 and 99.5%. The dry coating weight typically ranges from 2 to 80 grams per square meter. The PVOH-coated multilayer film can then be stretched at elevated temperatures to develop oriented PVOH layer 110 and multilayer film 100. This temperature is preferably above the glass transition temperature of at least one of the components of multilayer film 100. In general, the temperature is 80 to 160° C. In some embodiments, the temperature is 105 to 120° C. Following stretching, the film stack can be heat set, preferably at a temperature of 160 to 220° C.

The film is typically stretched from 2 to 10 times the original dimension. Preferably, the film will be stretched from 3 to 6 times the original dimension. The film may be allowed to dimensionally relax in the cross-stretch direction from the natural reduction in cross-stretch direction (equal to the square root of the stretch ratio) to being constrained (i.e., no substantial change in cross-stretch dimensions). The film may be stretched in the machine direction, as with a length orienter, or in width using a tenter.

Figure 3A:
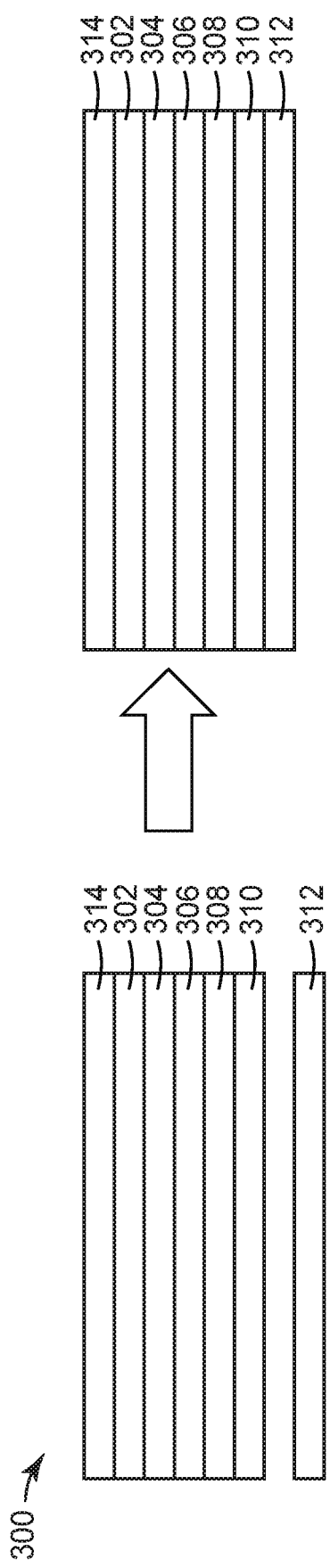

A series of lamination/delamination steps can used to prepare the oriented film stack for quarter wave coating and staining. For example, in step 1, shown in FIG. 3A, premask 312 can be laminated to oriented PVOH layer 310 of oriented multilayer film 300. In addition to PVOH layer 310, multilayer film 300 includes PENg tough layer 308, peel layer 306, tie layer 304, orienting layer 302 optional premask 314. Premask 312 protects PVOH layer 310 throughout the process and handling under the PVOH layer is stained. Premask 312 typically comprises polyethylene terephthalate. In some embodiments, premask 312 is optically clear, e.g., for ease of optical inspection. Premask 314 protects orienting layer 302 and, optionally, provides additional support. In some embodiments, premask 314 is provided by Tredegar Corporation (Richmond, VA).

Figure 3B:
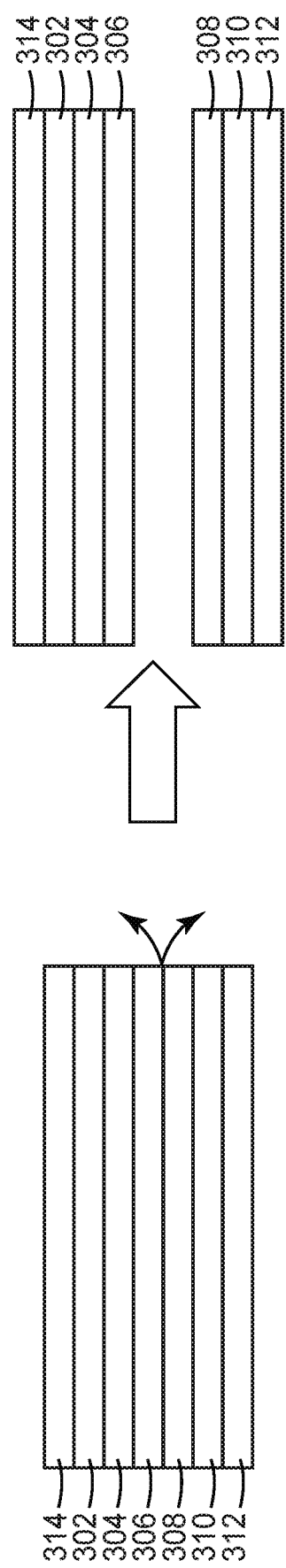

In step 2, shown in FIG. 3B, PENg tough layer 308 and peel layer 306 are separated. The carrier layers are removed and PENg tough layer 308 is exposed.

In step 3, shown in FIG. 3C, quarter-wave retarder 316 is coated on PENg tough layer 308. Quarter-wave retarders can be provided, e.g., from oriented polymeric materials such as polycarbonate, polyethyl terephthalate or polyvinyl alcohol or from coated liquid crystal materials. Suitable materials include, e.g., linear photopolymerizable polymer (LPP) materials and the liquid crystal polymer (LCP) materials described in US Pat. App. Pub. Nos. US 2002/0180916 (Schadt et al.), US 2003/028048 (Cherkaoui et al.) and US 2005/0072959 (Moia et al.). Suitable LPP materials include ROP-131 EXP 306 LPP and suitable LCP materials include ROF-5185 EXP 410 LCP, both available from Rolic Technologies, Allschwil, Switzerland. In some examples, quarter wave retarders may be quarter wave retarders at at least one wavelength in the predetermined wavelength range. In FIG. 3C, quarter-wave retarder 316 is shown as one layer, but it can comprise multiple layers such as, e.g., an LPP layer, an LCP half wave plate and an LCP quarter wave plate.

In step 4, shown in FIG. 3D, premask 318 is added to quarter-wave retarder 316 to provide support in the staining step. Premask 318 typically comprises polyethylene terephthalate. In some embodiments, premask 318 is optically clear, e.g., for ease of defect measurement or transmission measurement to gauge level of stain without removing the premask. Premask 318 typically comprises a pressure sensitive adhesive (PSA) layer, preferably an optically clear PSA to adhere the premask. The PSA is selected to survive the staining step and be removable.

Figure 3E:
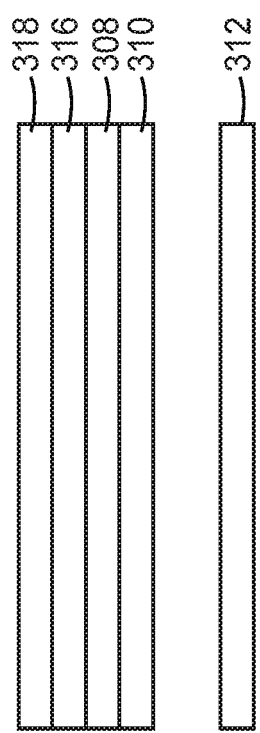
Figure 3E:
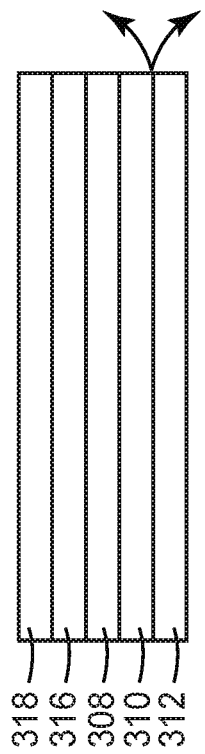

In step 5, shown in FIG. 3E, premask 312 is removed to expose PVOH layer 310 for staining.

Figure 3F:
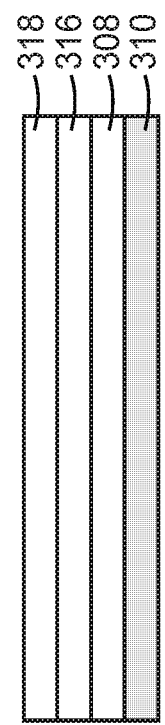
Figure 3F:
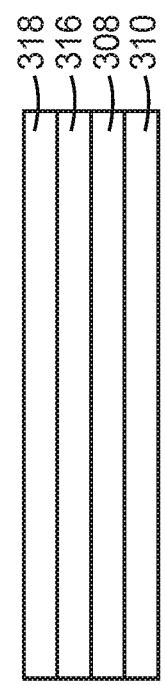

In step 6, shown in FIG. 3F, PVOH layer 310 is stained with an iodine solution to form an absorbing polarizer. The process includes an iodine staining and (optional) borating procedure. The stain bath is typically an aqueous solution of iodine. In some embodiments, the amount of iodine in 0.1 part by weight to 0.5 parts by weight with respect to 100 parts by weight water. In some embodiments, the aqueous solution of iodine is compounded with an iodide, e.g., in order to increase the solubility of iodine in water. Examples of useful iodides include potassium iodide, lithium iodide, sodium iodide, zinc iodide, aluminum iodide, lead iodide, copper iodide, barium iodide, calcium iodide, tin iodide, and titanium iodide. The composition can comprise, e.g., water (e.g., 80 wt %), potassium iodide (e.g., 19.7%) and iodine (e.g., 0.3%).

The boration bath composition is an aqueous solution of boric acid. The composition can be obtained by dissolving boric acid and/or a borate in water as a solvent. The concentration of boric acid is typically 1 part by weight to 10 parts by weight with respect to 100 parts by weight water. In some embodiments, the boration bath can comprise, e.g., water (e.g., 80 wt %), boric acid (e.g., 14%) and sodium borate (e.g., 6%).

The stain bath step is typically carried out, e.g., at a bath temperature of about 20 to 50° C. for about 5 seconds to 5 minutes. In some embodiments, the stain bath step is carried out at about 30° C. for about 30-40 seconds.

The optional boration step is typically carried out e.g., at a bath temperature of about 40 to 85° C. for about 15 seconds to 5 minutes. In some embodiments, the boration step is carried about at about 65° C. for about 40-50 seconds.

After boration, the film stack can be rinsed with water and dried, e.g., for 5 minutes in a 70° C. oven. The resulting film stacks are surprisingly crack-free and mechanically robust. They are ready for integration into a device such as a bendable or foldable display device for use as a circular polarizing film to reduce reflectivity.

EXAMPLES

Objects and advantages of this invention are further illustrated by the following examples, but the particular materials and amounts thereof recited in these examples, as well as other conditions and details, should not be construed to unduly limit this invention.

The general process for producing the PVOH films is described in U.S. Pat. No. 6,096,375. The cast film may often be primed for adhesion to the PVOH, in this case it was not primer coated. The polyvinyl alcohol coating solution should contain between 2 and 20% polymer in water based on weight, with the preferred concentration being between 5 and 15%. The polyvinyl alcohol should have a degree of hydrolysis of between 95 and 100%, preferably between 97 and 99.5%. The dry coating weight should range from 2 to 80 grams per square meter. The polyvinyl alcohol coated cast film is then stretched at elevated temperatures to develop oriented polyvinyl alcohol and oriented base film. This temperature is preferably above the glass transition temperature of least one of the components of the base cast film. In general, the temperature should be between 80 and 160° C., preferably between 100 and 160° C. The film should be stretched from 2 to 10 times the original dimension. In comparative example 1, the cast film was a trilayer with 2 outer layers of 90/10 coPEN, a polymer composed of 90% polyethylene naphthalate (PEN) and 10% polyethylene terephthalate (PET) and an inner layer of copolyester Eastar GN071 (Eastman Chemical, Kingsport, TN).

Preferably, the film will be stretched from 3 to 6 times the original dimension. The film may be allowed to dimensionally relax in the cross-stretch direction from the natural reduction in cross-stretch direction (equal to the square root of the stretch ratio) to being constrained (i.e., no substantial change in cross-stretch dimensions). The film may be stretched in the machine direction, as with a length orienter, or in width using a tenter or optionally both where the cast web is stretched in one direction before PVOH coating.

Comparative Examples

The general process for producing the PVOH films is described in U.S. Pat. No. 6,096,375.

A polyethylene 2,6-naphthalene dicarboxylate-co-terephthalate was fed at 50 pph, to a first twin screw extruder, conveyed, melted (530 F melt), mixed, passed through a 7 μm media 30 disc filter. Eastar copolyester GN071 (Eastman Chemical, Kingsport, TN).

GN071 from Eastman Chemicals, Kingsport, TN was fed at a rate of 220 pph in a second twin screw extruder, conveyed, melted (530 F melt), mixed, passed through a 7 μm media 30 disc filter. The copolyester GN071 was fed into the core of a 3 layer feed block and the polyethylene 2,6-naphthalene dicarboxylate-co-terephthalate was fed into a skin plate.

The 3 layers were then extruded through a die and casting with electrostatic pinning against a chilled wheel.

The film was coated with PVOH in a solution that was composed of 89 weight % water, 11 weight % PVOH, and 0.01 weight % surfactant. The PVOH is Kuraray 2899 from Kuraray America (Houston, TX). The surfactant was Dynol 604 available from Air Products (Allentown, PA).

The PVOH coated film was stretched in transverse direction to a draw ratio of about 6.0 at a temperature of 283 F. The final thickness film was about 72.6 um Materials were solvent coated and UV cured on the PVOH layer with the slow optical axis oriented at 45 degrees relative to the pass direction of the integrated polarizer. The coated layer had a retardation of 138 nm at a wavelength of 550 nm. (Retardation is defined by Re=(ni−nj)*d, where ni−nj is the in-plane birefringence difference between the slow and fast optical axis of the coated material and d is the thickness of the coated layer.) The coating materials utilized were materials similar to those described in US2002/0180916, US2003/028048 and US2005/0072959 where the linear photopolymerizable polymer (LPP) material was ROP-131 EXP 306 LPP and the liquid crystal polymer (LCP) material was ROF-5185 EXP 410 LCP (both available from Rolic Technologies, Allschwil, Switzerland).

The oriented polyvinyl alcohol coating with quarter wave coating was then removed from the oriented base film. A PET premask with adhesive was laminated to the quarter wave layer with the oriented polyvinyl alcohol coating and then peeled away from the oriented base film.

The oriented polyvinyl alcohol coating and quarter wave coating attached the PET premask were then stained with iodine based staining solutions and then borated to fix the coating.

The iodine staining and borating procedure included the following elements. The stain bath composition was 80 wt % water, 19.7 wt % potassium iodide and 0.3 wt % iodine. The boration bath composition was 80 wt % water, 14 wt % boric acid and 6.0 wt % sodium borate. The staining process step used a stain bath temperature of 30° C. and 34 seconds exposure. The boration process step used a boration bath temperature of 65° C. bath temperature and 42 second exposure. After boration the samples were rinsed in 23° C. water for 24 seconds and then dried for 5 minutes in 70° C. oven.

Figure 4:
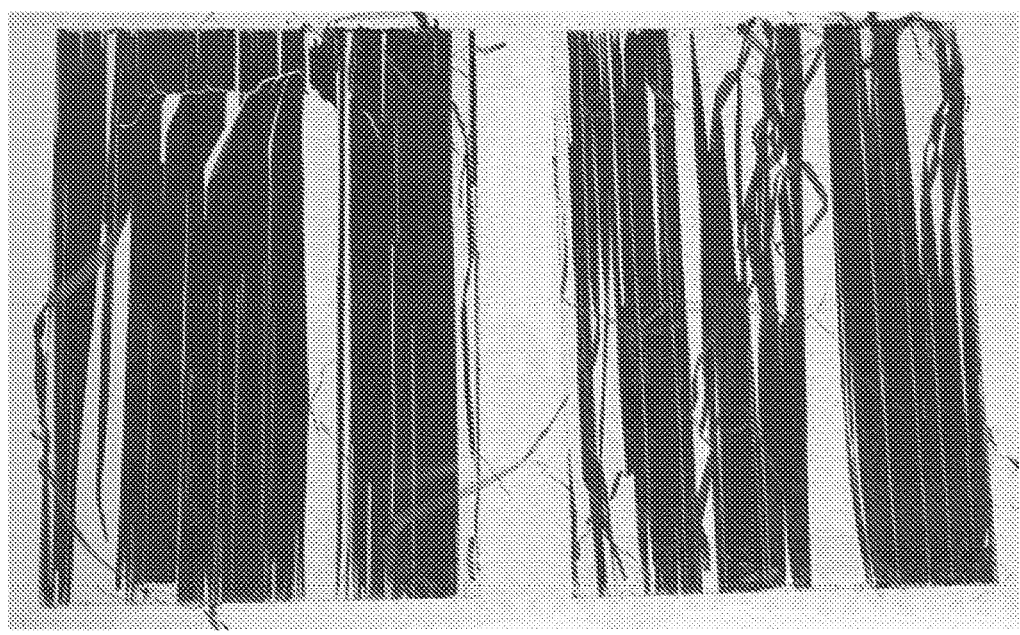
FIG. 4 is a magnified photograph of an iodine stained PVOH coating of a comparative example.

After drying, the PVOH coating was significantly cracked into fibers and was unusable as an optical film as shown in FIG. 4.

Many process conditions were tried in the staining and drying process to prevent cracking, as shown in Table 1. With the comparative example 1 structure, all had unacceptable cracking

TABLE 1

| Sample | Staining Condition | Results |
| --- | --- | --- |
| Comparative 1A-1F, H, L | Standard-no oven dry | Cracking |
| Comparative 1G, K | 21 sec boration-43 deg C. oven | Cracking |
| Comparative 1I, M | 21 sec boration-standard oven | Cracking |
| Comparative 1J, N | Standard-35 deg C. oven | Cracking |
| Comparative 1O | No boration | Cracking |
| Comparative P | 2 min boration | Cracking |
| Comparative Q | Constrained in MD-no oven dry | Cracking |

Examples

Experimental samples were created using a 4 layer feed block with a 2 mil LmPEN layer, a 0.25 mil tie layer, 0.25 mil peel layer and 0.5 mil PENg layer.

A polyethylene 2,6-naphthalene dicarboxylate-co-terephthalate was fed at 475 pph, to a first twin screw extruder, conveyed, melted (530 F melt), mixed, passed through a 7 um media 30 disc filter. Kraton G1657 (Kraton Corporation, Houston, TX) and PP9074MED from Exxon Mobil Corporation Irving TX were fed at 29 and 12 pph, respectively to a second twin screw extruder, conveyed, melted (530 F melt), mixed, and passed through a 7 um media 15 disc filter. Kraton G1657 (Kraton Corporation, Houston, TX) and PP9074MED from Exxon Mobil Corporation Irving TX were fed at 4.6 and 33.5 pph, respectively, to a third twin screw extruder. PENG30 was fed at 50 pph, to a fourth twin screw extruder.

The four melt streams were fed to a 4-layer feed block when first melt train fed one exterior layer, the second melt train fed the interior layer adjacent to the first melt train, the third melt train feed the interior layer adjacent to the second melt train and the fourth melt train fed the exterior layer adjacent to the third melt train.

The outermost layers and alternating interior layers and the balance of alternating interior layers being fed by the second melt train. The 4 layers were the extruded through a die and casting with electrostatic pinning against a chilled wheel and subsequently stretched to a draw ratio of about 3.3 in the machine direction at a temperature of about 250 F.

The PENG30 was coated with PVOH in a solution that was composed of 89 weight % water, 11 weight % PVOH, and 0.01 weight % surfactant. The PVOH is Kuraray 2899 from Kuraray America (Houston, TX). The surfactant was Dynol 604 available from Air Products (Allentown, PA). A primer layer of sulfonated polyester was coated between the PVOH solution and the PENG30 layer.

The PVOH coated film was stretched in transverse direction to a draw ratio of about 5.0 at a temperature of 290 F, then heat set at a temperature of 325 F. The final thickness film was about 72.6 um A second PVOH coated film was made in a similar manner except the PENG extrusion rate was 100 pph. The total thickness of this film was 78.9 um.

A series of lamination steps were used to remove the tough film layer and PVOH and prepare for liquid crystal quarter wave coating. In step 1, optically clear PET premask NSA33T from Sun-a-kaken, Japan was added to the PVOH side of the film. In step 2, the peel, tie, and LmPEN carrier layers were removed, exposing the PENg. In step 3, LPP layers and LCP layers were coated onto the PENg to form an achromatic quarter wave plate. Materials were solvent coated and UV cured on the PENg layer with the slow optical axis oriented at 45 degrees relative to the pass direction of the integrated polarizer. The coated layer had a retardation of 138 nm at a wavelength of 550 nm. (Retardation is defined by Re=(ni−nj)*d, where ni−nj is the in-plane birefringence difference between the slow and fast optical axis of the coated material and d is the thickness of the coated layer.) The coating materials utilized were materials similar to those described in US2002/0180916, US2003/028048 and US2005/0072959 where the linear photopolymerizable polymer (LPP) material was ROP-131 EXP 306 LPP and the liquid crystal polymer (LCP) material was ROF-5185 EXP 410 LCP (both available from Rolic Technologies, Allschwil, Switzerland). The PENg layer remained free from haze after coating the LCP despite the LCP coating process containing aggressive solvent n-butyl acetate.

An optically clear PET premask was laminated to the LPP and LCP coated side to provide support in the staining step. The PVOH side optically clear PET was removed. The PVOH was stained with an iodine solution to form an absorbing polarizer. The films were immersed in iodine solution for 32 seconds at 30 C, then in a boration tank for 42 seconds at 65 C and then rinsed in 23 C water bath. The films were dried in a 70 C oven for 5 mins. The resulting films did not have cracks after drying and were mechanically robust.

Figure 5:
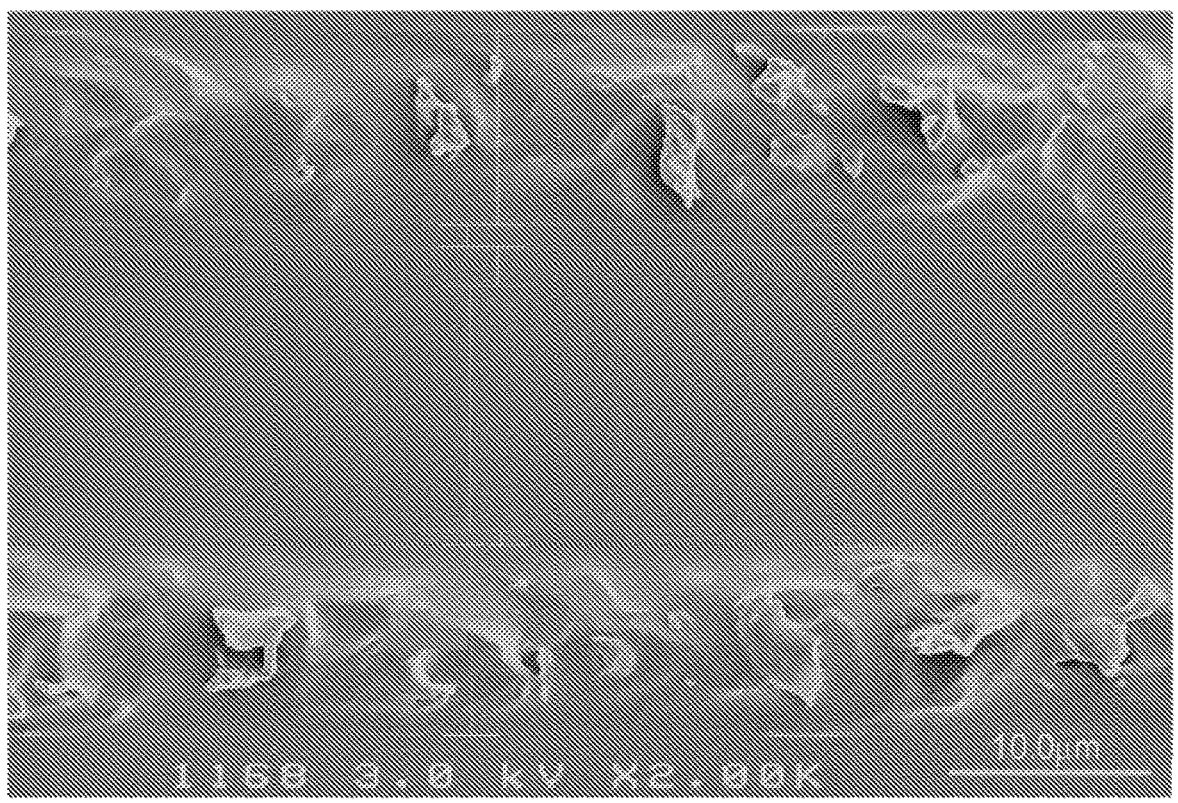
FIG. 5 is a scanning electron microscope (SEM) image of a cross-section of a circular polarizer.
Figure 6:
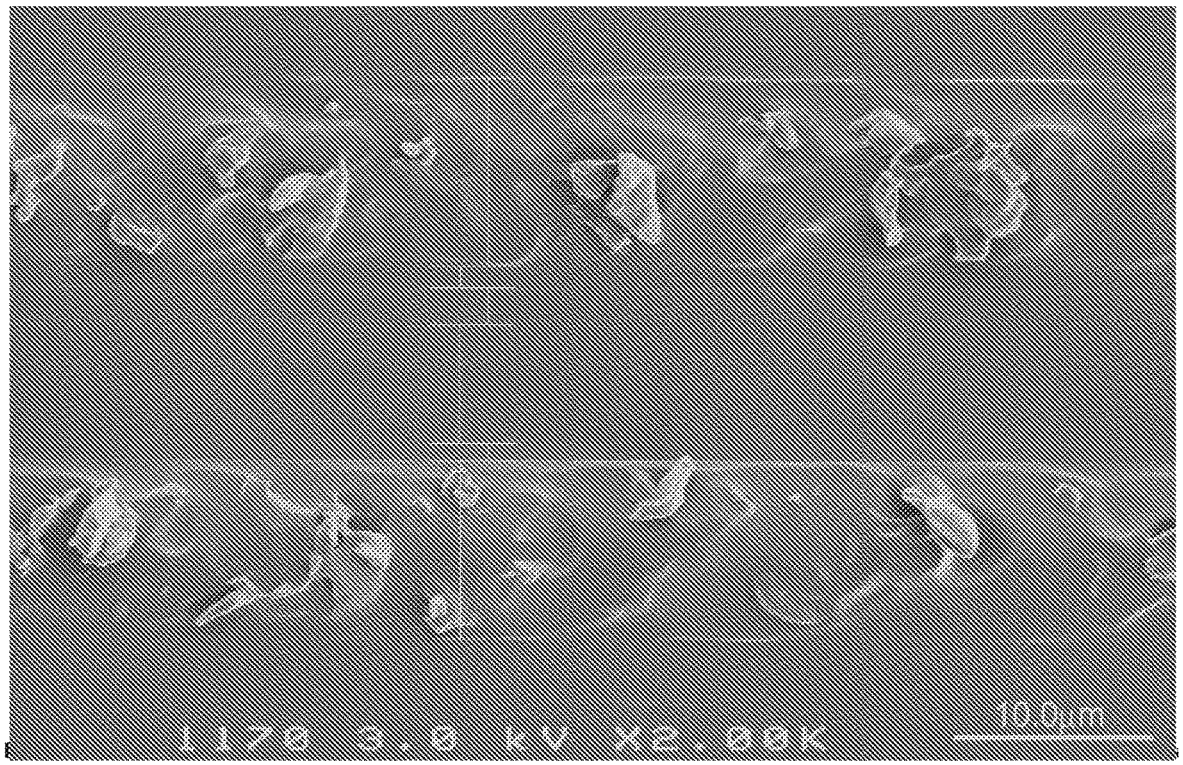
FIG. 6 is a SEM image of a cross-section of a circular polarizer.

SEM cross sections (FIGS. 5 and 6) were taken to measure the thickness of the ultra-thin circular polarizer.

The complete disclosures of the publications cited herein are incorporated by reference in their entirety as if each were individually incorporated. Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

We claim:

1. A film stack comprising an oriented first layer comprising polyvinyl alcohol disposed on an oriented second layer comprising naphthalene dicarboxylate containing copolyester resin, wherein the oriented second layer has in-plane birefringence Δnxy<0.02.

2. The film stack of claim 1 wherein the oriented second layer has an in-plane retardance less than 100 nm.

3. The film stack of claim 1 wherein the oriented second layer is biaxially oriented.

4. The film stack of claim 1 claims further comprising a quarter-wave retarder disposed on the oriented second layer opposite the oriented first layer.

5. The film stack of claim 4 wherein the quarter-wave retarder comprises an oriented polymeric material or a coated liquid crystal material.

6. The film stack of claim 1 wherein the oriented first layer is stained with iodine.

7. The films stack of claim 4 further comprising a premask disposed on the quarter-wave retarder opposite the oriented second layer.

8. The film stack of claim 1 further comprising a premask disposed on the oriented first layer opposite the oriented second layer.

9. The film stack of claim 7 wherein the premask comprises polyethylene terephthalate.

10. The film stack of claim 1 wherein the film stack has a total thickness of less than 35 nm.

11. The film stack of claim 10 wherein the film stack has a total thickness of less than 20 μm.

12. The film stack of claim 11 wherein the film stack has a total thickness of less than 15 μm.

13. The film stack of claim 1 wherein the oriented first layer has a thickness less than 5 μm.

14. The film stack of claim 13 wherein the oriented first layer has a thickness less than 3 μm.

15. A film stack comprising
   (a) a carrier film comprising a strippable layer disposed between an oriented second layer comprising naphthalene dicarboxylate containing copolyester resin with in-plane birefringence Δnxy<0.02 and a layer of strain hardening polyester having a glass transition temperature at least 5° C. greater than the glass transition temperature of the naphthalene dicarboxylate containing polyester resin of the oriented second layer, and
   (b) an oriented first layer comprising polyvinyl alcohol disposed on the oriented second layer opposite the strippable layer.

16. A method of making a film stack comprising:
   (c) providing a carrier film comprising a strippable layer disposed between a second layer comprising naphthalene dicarboxylate containing copolyester resin with in-plane birefringence Δnxy<0.02 and a layer of strain hardening polyester having a glass transition temperature at least 5° C. greater than the glass transition temperature of the naphthalene dicarboxylate containing polyester resin of the oriented second layer,
   (d) coating a first layer comprising polyvinyl alcohol on the strain hardening polyester, and
   (e) orienting the resulting coated carrier film in a second direction.

17. The method of claim 16 comprising orienting the carrier layer in a first direction before coating the first layer.

18. The method of claim 17 wherein orienting the carrier layer is done with heat.

19. The method of claim 16 further comprising heat setting the film stack.

20. The method of claim 16 further comprising removing the strippable layer and the layer of strain hardening polyester to expose the second layer.

* * * * *